United States Patent [19]

Ejiri

[11] Patent Number: 4,710,910
[45] Date of Patent: Dec. 1, 1987

[54] SAFE LOADING-UNLOADING SYSTEM FOR TRAY IN COMPACT DISC PLAYER

[75] Inventor: Kazushige Ejiri, Iwaki, Japan

[73] Assignee: Alpine Electronics Inc., Japan

[21] Appl. No.: 881,848

[22] Filed: Jul. 3, 1986

[30] Foreign Application Priority Data

Jul. 13, 1985 [JP] Japan ............................ 60-107367[U]

[51] Int. Cl.$^4$ .......................... G11B 3/10; G11B 17/04
[52] U.S. Cl. .................................. 369/75.2; 369/77.2
[58] Field of Search .................... 369/75.1, 75.2, 77.2, 369/79

[56] References Cited

U.S. PATENT DOCUMENTS

| | | | |
|---|---|---|---|
| 4,454,599 | 6/1984 | Tsuchiya | 369/77.2 |
| 4,467,465 | 8/1984 | Saito et al. | 369/77.2 |
| 4,481,617 | 11/1984 | Mabry | 369/77.2 |
| 4,617,655 | 10/1986 | Aldenhoven | 369/77.2 |

Primary Examiner—Steven L. Stephan
Attorney, Agent, or Firm—Guy W. Shoup

[57] ABSTRACT

A safe loading-unloading system for a tray used with a compact disc player. The system has lock arms provided on slide plates which move longitudinally along the side walls of a player body during loading and provided with lock pins for the purpose of semi-fixing a tray loaded in the player body, and relief holes formed in first and second apertures which are so formed as to allow the lock arms to be inserted into the side walls of the player body and the slide plates such that the lock pins are brought into contact with the side walls except when the tray is in its initial loading position and pass through the relief holes in the initial loading position of the tray. By this structure, it is possible to safely prevent the loading and unloading of the tray during the reproduction and to utilize most conventional system for practising the complete lock, allowig an increase in cost to be removed.

1 Claim, 7 Drawing Figures

SAFE LOADING-UNLOADING SYSTEM FOR TRAY IN COMPACT DISC PLAYER

BACKGROUND OF THE INVENTION

1. Field of the Invention

This invention relates to a safe loading-unloading system which safely loads and unloads a tray in a compact disc player.

2. Description of Prior Art

A compact disc player scans the recording information surface of a small disc which rotates by using an optical pickup and regenerates information by processing the signals obtained by this scanning. In some compact disc players, the disc is enclosed in a square casing or tray which is inserted into the player body.

In this case, the disc in its tray must be loaded onto a suitable position of the player body (loading) at which the disc is separated from the tray in order to be freely rotated on a turn table at least during the transition to a reproducing process. During the reproduction, the tray left behind is naturally useless.

In a conventional compact disc player, a tray in a semi-fixed state which has once been loaded in the player body is not handled with any special consideration. However, such a tray once loaded usually requires no further handling and is in a semi-fixed state so that a user may sometimes unload the tray from the player body with little consiousness, or just for fun, resulting in certain trouble which leads to reproduction being rendered impossible.

SUMMARY OF THE INVENTION

In view of the above-mentioned circumstances, it is a primary object of the present invention to provide a safe loading-unloading system for a tray used with a compact disc player.

To this end, the present invention provides a safe loading-unloading system comprising lock arms rotatably provided on slide plates which move longitudinally along the side walls of the player body during loading and having lock pins for the purpose of semi-fixing the tray loaded in the player body, and relief holes are formed in first and second holes which are so formed as to allow the lock arms to be inserted into the side walls of the player body and the slide plates so that the lock pins are brought into a constant relationship with the side walls in a position other than the initial loading position of the tray and are passed through the relief holes when the tray is in its initial loading position.

By virtue of this arrangement, when the initial loading of the tray is completed, the front end of the tray is blocked by the hooks of the lock arms and is brought into a semi-fixed state, and at the same time, when a loading motor is driven to start a loading operation, the tray moves in the forward direction of the player. Then, when the tray starts to move, the lock arms are brought into a semi-fixed state because the lock pins thereof make contact with the side walls, and thus it is impossible to pull out the tray except at the time of ejection.

DESCRIPTION OF THE PREFERRED EMBODIMENT

This invention will now be explained with reference to the drawings.

Figure 1:
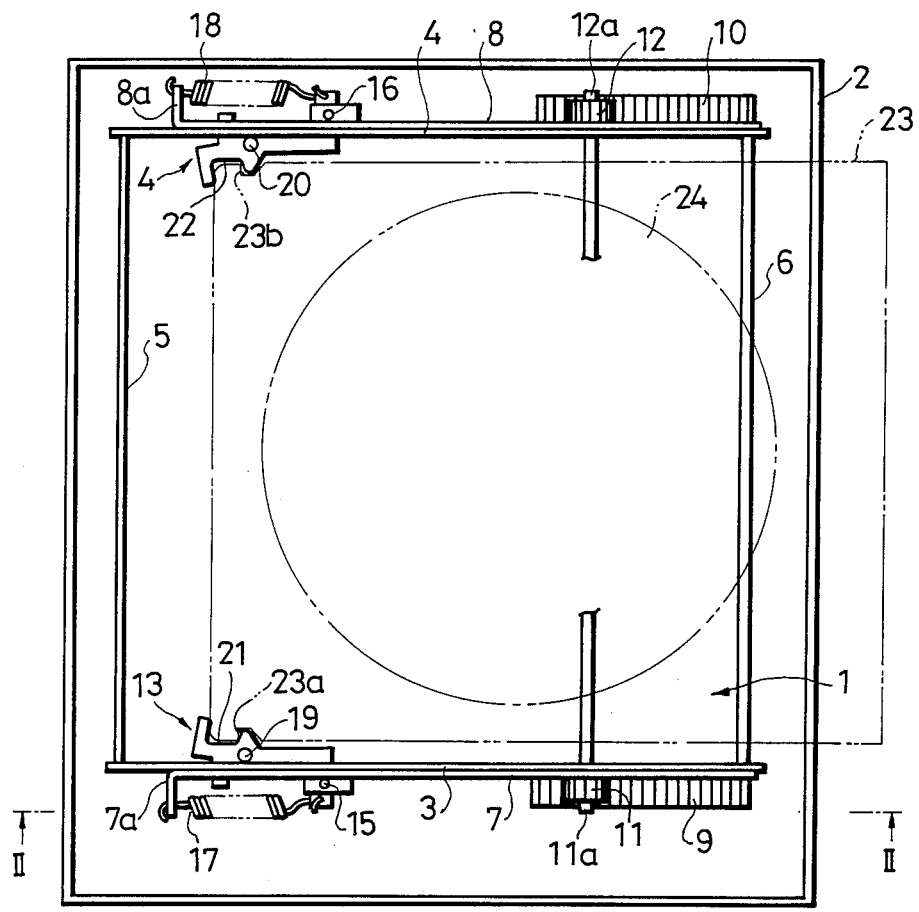
FIG. 1 is a plane view of the main part of the embodiment of the compact disc player to which this invention is related.

As shown in FIG. 1, the body 1 of the compact disc player to which this invention relates is received in a square external case 2, and the side walls defining the external shape of the player body 1 are connected to each other by connecting shafts 5 and 6. Slide plates 7 and 8 are respectively provided on the side walls, the respective slide plates 7 and 8 being provided with rack plates 9 and 10 each of which is engaged with pinions 11 and 12, respectively. The respective pinions 11 and 12 are held by shafts 11a and 12a against the side walls 3 and 4 and the respective shafts 11a and 12a are connected to a loading motor not shown in the drawings.

The respective slide plates 3 and 4 are provided with lock arms 13 and 14 at the front ends (the left with lock arms 13 and 14 at the front ends (the left side in the drawing) of the rack plates 9 and 10, and the respective lock arms are rotatable in the horizontal plane around rotative pins 15 and 16 disposed at the rear ends of the lock arms 13 and 14. In this state, the respective rotative pins 15 and 16 are fixed to the slide plates 7 and 8, and on the other hand, energizing springs 17 and 18 for rotation are provided between the adjacent positions of the rotative pins 15 and 16 of the lock arms 13 and 14 and the brackets 7a and 8a at the front ends of the slide plates 7 and 8, respectively.

In addition, once the lock arms 13 and 14 have been provided with the lock pins 19 and 20 which project in the vertical direction, the hooks 21 and 22 are formed at the front ends of the lock arms 13 and 14, respectively. The hooks 21 and 22 are capable of being engaged with and detached from the stopping grooves 23a and 23b formed on the sides of the front portion of the tray 23 for loading into the player body 1. The tray 23 is adapted to have a disc 24 mounted thereon and to be moved longitudinally along a guide member (not shown in the drawings) in the player body 1.

Figure 2:
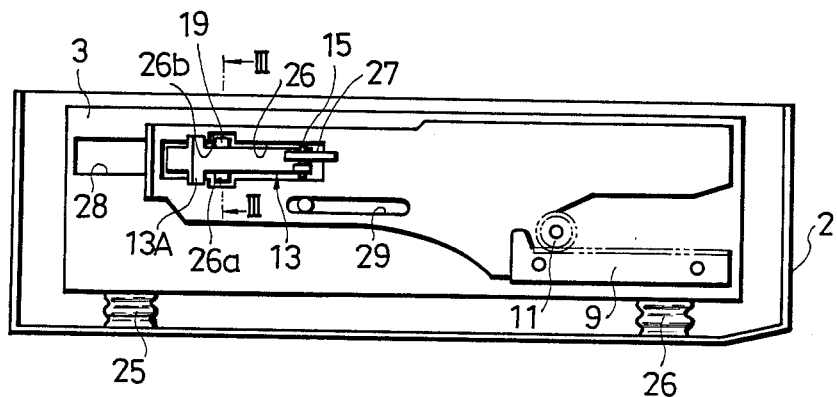
FIG. 2 is a side view taken along the line II—II of FIG. 1 with the lock arms being rotated.

On the other hand, as shown in FIG. 2, the player body 1 is received in the external case 2 through buffer members 24 and 25, and a first aperture is formed on the slide plate 7 so that the lock arm 13 may be rotatably insert therein, with a support arm 27 fixed to the rear end of the first aperture 26 and the rotative pin 15 of the lock arm 13 supported on the supporting arm 27 by the shaft. The nicks 26a and 26b are formed approximately at the center of the first aperture 26 so as to correspond to the position of the lock pin 19 and the second aperture 28 is formed on the side wall 3 in the position opposite to that of the first aperture 26, the second aperture 28 being formed so as to enable the rotation of the lock arm 13. A stopper 13A is formed on the inside of the slide plate at the front end of the lock arm 13, i.e. on the left side as view in FIG. 2, and this stopper 13A which contacts with the slide plate 7 enables rotation of the lock arm 13 within the given range, that is to say, the lock arm 13 is inhibited from being pulled out. A guide pin 30 projecting from the side wall 3 is inserted into the guide groove 29 which extends in the transverse direction and is formed on the slide plate 7.

Figure 3:
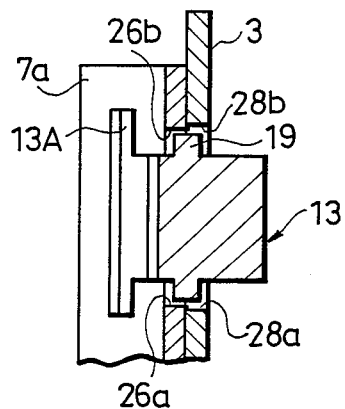
FIG. 3 is a sectional view taken along the line III—III of FIG. 2.

In the second aperture 28, the nicks 28a and 28b are formed in a position opposite to that of the nicks 26a and 26b of the first aperture 26 shown in FIG. 3.

The above description applies to one side wall 3 and the other side wall 4 may be explained in a similar manner.

Next, the operation of this embodiment will be described.

Figure 4:
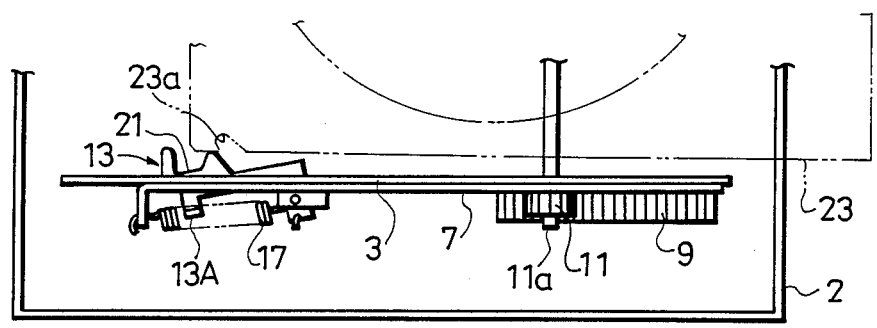
FIG. 4 is a sectional view of the main part of the lock arm when being rotated.

As shown in FIG. 1, when the tray 23 is guided to the guide member (not shown in the drawing) and loaded in the given position (the initial "loading-completed" position) of the player body 1, the stopping grooves 23a and 23b are engaged with the hooks 21 and 22 of the lock arms 13 and 14. In this state, as shown in FIGS. 3 and 4, since the nicks 26a and 26b formed in the first aperture 26 of the slide plate and the nicks 28a and 28b formed in the second aperture 28 of the side wall 3 come into alignment with each other, the lock arm 13 (description of the lock arm 14 will here be omitted) acts in cooperation with the nicks 26a, 26b, 28a, and 28b to release the lock pin 19, thus allowing the lock pin 19 to be freely rotated around the rotative pin 15 in the apertures 26 and 28. Therefore, in the initial "loading-completed" position, the tray 23 can be freely loaded and unloaded. As described above, the energizing spring 17 is provided on the lock arm 13 in the direction in which the lock arm 13 approaches the tray 23, and the contact of the stopper 13A with the slide plate 7 inhibits further rotation of the lock arm 13.

Figure 5:
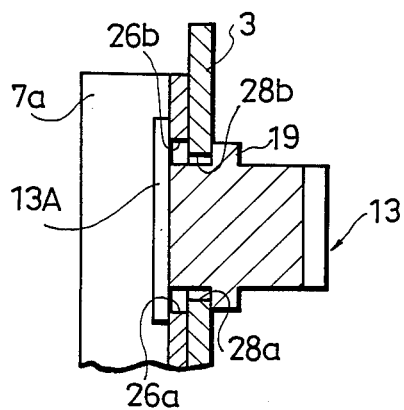
FIG. 5 is a sectional view taken along the line V—V of FIG. 6 which illustrates the state wherein it is impossible for the lock arms to be rotated.
Figure 6:
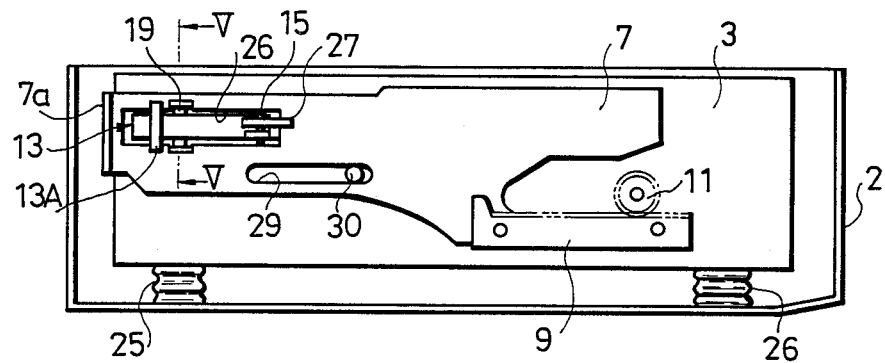
FIG. 6 is a side view of the main part of a tray during the loading.
Figure 7:
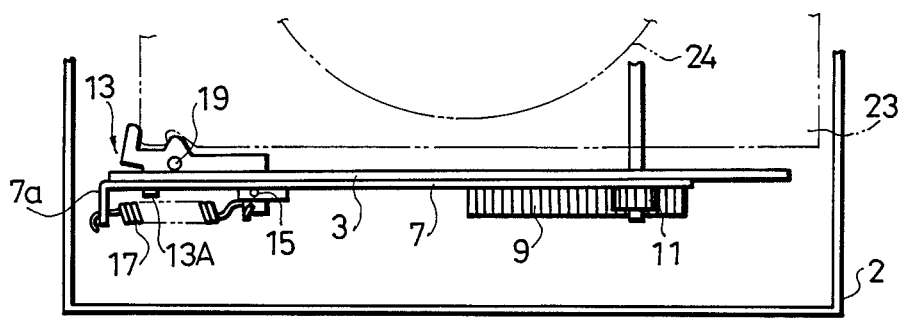
FIG. 7 is a plane view of the main part in the state shown in FIG. 6.

Then, when the slide plate 7 starts to move to the forward end of the player body 1 when the loading motor is driven, the lock arm 13 also moves along the first and second apertures 26 and 28. However, since the nicks 26a and 26b of the first aperture 26 are separated from the nicks 28a and 28b of the second aperture 28 by this movement, the lock pin 19 is brought into contact with the side wall 3 (see FIGS. 5 and 7), the rotation of the lock arm 13, i.e. rotation in the direction in which the lock arm 13 would be separated from the tray 23, is prevented, and it becomes impossible to load or unload the tray 23 except in the initial "loading-completed" position.

As described above, since this invention is so constructed that the tray is in a completely locked state except when it is in the initial "loading-completed" position in the player body, undesirable unloading of the tray during, for example, the interior position when the disc is separated from the tray, can be safely prevented, and a system for completely locking the tray at the interior position can be realized without an increase in cost.

What is claimed is:

1. A system for loading and unloading a tray carrying a compact disc into and from a compact disc player, wherein the compact disc player has a body with a front insertion part, and means for receiving the disc tray inserted in a longitudinal direction in said player body to an initial loading position and for moving the inserted tray to an operative loading position at which the disc can be separated from its tray and used for reproducing information recorded thereon, said system comprising:

a pair of side walls mounted in said player body spaced apart in the transverse direction so as to define a tray insertion path between them and each having a longitudinally extending first aperture formed therein;

a pair of slide plates each movable longitudinally along a respective one of said side walls and having a second aperture formed therein which is in registration with the first aperture of the respective side wall as the slide plate is moved longitudinally therealong;

a pair of pivotable lock arms each pivotably mounted through the second aperture of a respective one of said slide plates so as to be pivotable horizontally through the first aperture of the respective side wall at the initial loading position of the tray between an engaged position in which a free end of the lock arm is engaged in a corresponding groove in the leading edge of the tray and a disengaged position in which the free end of the lock arm is displaced from the groove in the tray;

biasing means for biasing each of said lock arms toward engagement of the free ends thereof into the grooves in the tray;

each of said lock arms having a lock pin formed thereon which abuts against a portion of the respective side wall when the respective slide plate is moved to the operative loading position of the tray, such that the lock arms are held in their engaged positions with the tray at the operative loading position in order to prevent disengagement of the tray from said lock arms and removal from the player body; and each of said first apertures of said side walls having a recess providing clearance for the lock pin of the respective lock arm at a position corresponding to the initial loading position of the tray, such that the lock arms are pivotable through the first apertures to their disengaged positions to allow insertion and removal of the tray into and from the player body at the initial loading position.

* * * * *